US010558879B2

(12) United States Patent
Pollard et al.

(10) Patent No.: US 10,558,879 B2
(45) Date of Patent: Feb. 11, 2020

(54) DIGITAL SIGNATURE AUTHENTICATION (71) Applicant: Hewlett-Packard Development Company, L.P., Houston, TX (US)

(72) Inventors: Stephen Pollard, Dursley (GB); Steven J. Simske, Fort Collins, CO (US); Guy Adams, Bristol (GB)

(73) Assignee: Hewlett-Packard Development Company L.P., Spring, TX (US)

( * ) Notice: Subject to any disclaimer, the term of this patent is extended or adjusted under 35 U.S.C. 154(b) by 101 days.

(21) Appl. No.: 15/522,107

(22) PCT Filed: Oct. 30, 2014

(86) PCT No.: PCT/US2014/063115
§ 371 (c)(1),
(2) Date: Apr. 26, 2017

(87) PCT Pub. No.: WO2016/068933
PCT Pub. Date: May 6, 2016

(65) Prior Publication Data
US 2017/0330046 A1 Nov. 16, 2017

(51) Int. Cl.
*G06K 9/18* (2006.01)
*H04N 1/32* (2006.01)
(Continued)

(52) U.S. Cl.
CPC ............... *G06K 9/18* (2013.01); *G06F 21/32* (2013.01); *G06F 21/36* (2013.01); *G06K 9/20* (2013.01);
(Continued)

(58) Field of Classification Search
CPC G06K 9/18; G06K 19/06; G06K 9/20; G06K 9/46; H04N 1/32325;
(Continued)

(56) References Cited

U.S. PATENT DOCUMENTS 5,892,824 A * 4/1999 Beatson ............ G06K 9/00154
380/52
7,207,481 B2 4/2007 Barenburg et al.
(Continued)

FOREIGN PATENT DOCUMENTS

CN 1682478 10/2005
CN 101283354 10/2008
(Continued)

OTHER PUBLICATIONS

Abdourhamane Idrissa, Secure Protocols for Serverless Remote Product Authentication, Oct. 24, 2010, 7 pages. (Year: 2010).*
(Continued)

*Primary Examiner* — Chau Le
*Assistant Examiner* — Han Yang
(74) *Attorney, Agent, or Firm* — HP Inc. Patent Department (57) ABSTRACT Digital signature authentication systems and methods are disclosed. An example method of authenticating a digital signature extracted from a high resolution image includes comparing an extracted signature from an image to a reference signature. The example method also includes authenticating the extracted signature against the reference signature according to one of a plurality of different authentication protocols.

20 Claims, 6 Drawing Sheets (51) Int. Cl.
*G06F 21/36* (2013.01)
*G06F 21/32* (2013.01)
*G06K 9/20* (2006.01)
*G06K 9/46* (2006.01)
*G06K 19/06* (2006.01)
*G06F 16/00* (2019.01)

(52) U.S. Cl.
CPC ............... G06K 9/46 (2013.01); G06K 19/06 (2013.01); H04N 1/32256 (2013.01); H04N 1/32325 (2013.01); *G06F 16/00* (2019.01); *H04N 2201/3235* (2013.01); *H04N 2201/3269* (2013.01); *H04N 2201/3271* (2013.01)

(58) Field of Classification Search
CPC ....... H04N 1/32256; H04N 2201/3235; H04N 2201/3269; H04N 2201/3271; G06F 21/32; G06F 21/36; G06F 17/30; G06F 16/00
See application file for complete search history.

(56) References Cited

U.S. PATENT DOCUMENTS

| | | | |
|---|---|---|---|
| 7,543,748 B2 | 6/2009 | Kiliccote et al. | |
| 7,783,885 B2 | 8/2010 | Dietl et al. | |
| 7,904,725 B2 * | 3/2011 | Pavlicic | G06Q 20/02 713/155 |
| 7,930,546 B2 * | 4/2011 | Rhoads | G10L 25/48 358/3.28 |
| 8,122,252 B2 | 2/2012 | Karamchedu et al. | |
| 8,793,499 B2 | 7/2014 | Loughry | |
| 2005/0029354 A1 | 2/2005 | Frantz | |
| 2005/0257064 A1 | 11/2005 | Boutant et al. | |
| 2007/0033168 A1 * | 2/2007 | Minogue | G06F 17/30864 |
| 2013/0275763 A1 | 10/2013 | Lee et al. | |
| 2014/0169617 A1 * | 6/2014 | Pollard | H04N 1/32101 382/100 |
| 2015/0098629 A1 * | 4/2015 | Perna | G06K 9/00604 382/117 |

FOREIGN PATENT DOCUMENTS

| | | | | |
|---|---|---|---|---|
| CN | 101860824 | | 10/2010 | |
| CN | 104094286 | | 10/2014 | |
| EP | 0581317 | A2 | 2/1994 | |
| WO | WO-2013119235 | A1 * | 8/2013 | ......... G06K 9/00442 |

OTHER PUBLICATIONS

"The Hybrid Signature: Signing Digital Documents and Printing Authentiated Documents".

* cited by examiner

DIGITAL SIGNATURE AUTHENTICATION

BACKGROUND

Optical codes such as the barcode, are machine-readable codes which can be tied to a database to associate just about any type of information with an item (or person) associated with the optical code. While optical codes were originally linear representations (i.e., the traditional barcode), with the evolution of reading devices (e.g., the proliferation of cell phones and other mobile devices capable of reading optical codes), modern optical codes have evolved to include a variety of different types of images.

Most people are familiar with barcodes used at grocery stores and retail outlets. A barcode is affixed to a product, and the product is scanned at checkout. The barcode is associated with product information (e.g., item description and price) maintained in a database. Hence, when the barcode is scanned and a match is found product information can be displayed for the clerk.

Today, optical codes are used in a wide variety of applications. For example, optical codes are used to track inventory (e.g., amount and location of products), track luggage in airports, and tracking rentals (e.g., ski rentals, car rentals). Optical codes can also be used for identification (e.g., airline ticketing and even patient identification at health care facilities). Optical codes may also be used for quality control, and are continuing to find use in new applications. For example, a user may scan an optical code (e.g., a OR code) using their mobile phone while standing in a museum to receive instant information about a display the user is looking at.

DETAILED DESCRIPTION

With the widespread adoption of optical codes, and more accurate optical scanners and associated interpretive software, more sophisticated optical codes can be deployed. Digital signature authentication is disclosed, wherein a signature may be extracted from a target image (e.g., a high resolution image extracted with a low-cost microscope) and authenticated against a reference signature. The authenticated signature can be implemented to provide information and/or access to information in any of a wide variety of applications.

The target image may be of an engineered printed mark (i.e., specifically developed for the purpose of extracting a signature for use with digital signature authentication). The signature is based on innate stochastic properties of the print and its interaction with the substrate. The signature may be extracted from any printed item (e.g., character, glyph, barcode). The signature can be extracted from a linear outline, a 2D area, a halftone (or stegatone) image, or a 3D image. It is noted that most printed images can be considered "halftones." The term "stegatone" refers to a special type of halftone, where the individual dots of the halftone are intentionally perturbed to embed additional information. The extracted signature may be compared to a reference signature (previously stored), e.g., to prove authenticity of the item (or label for the item) associated with the high resolution image.

In an example, digital signature authentication includes a recruitment stage. During the recruitment stage, signatures are added to a database for future reference. Digital signature authentication may also include an authentication stage. During the authentication stage, signatures are extracted from a target image, and compared with the previously stored signatures. Digital signature authentication may operate according to any of a variety of protocols.

According to an example hierarchical signatures protocol, digital signature authentication includes extracting and comparing a hierarchy of signatures. For example, a first order (or "level") signature in the hierarchy may be used to authenticate the item, if the first order signature does not provide sufficient confidence in the authenticity, then a second order signature is compared, and so forth. Typically, the first order signature will be more readily extracted/compared (e.g., using less processing power) than a higher order signature, thereby enabling faster authentication when possible, and more confidence in the authentication when needed. In an example, different signatures may be captured with different image capture settings, such as differences in illumination (e.g., direction, wavelength, etc.), resolution, focal distance, and/or image capture techniques (e.g., using strobing).

The image may include multiple signatures and the authentication process determines which one of these to use. For example, if a first signature is unreadable (e.g., has worn off), then another area may be analyzed to obtain the second signature, and so forth, until a readable signature, is found that can be authenticated. These signatures may be discrete areas of the image, or may include portions of multiple areas. For example, an image having areas A, B, C, and D (each covering a quarter of the area) may include signatures A, B, C, and D. But additional signatures may be E incorporating aspects of signature A, along with aspects of signature B, and so forth. Also multiple signatures can be extracted from the same physical area, using separate signature extraction techniques.

According to an example revisable selection of signatures protocol, the signatures evolve over time. By "revisable signatures," it is meant that over time a better signature may be discovered (or identified), and from that time on, the new signature protocol is used. In the revisable method the signature to use is determined according to the prevailing wisdom at the time when the signature was recruited. The signatures may "evolve" over time, and thus the authentication needs to know which signature to use. This technique may also be used to expire signatures over time for security purposes—as flaw in their design or robustness comes to light.

In an example, information is provided to correctly identify the corresponding signature being used (e.g., as registered in the database) so that the correct comparison can be made. In an example, the image capture device selects which signature to use based on information stored in the image or elsewhere (e.g., a barcode or stegatone in the image and/or information stored in a database).

It is noted that one of the multiple signatures (e.g., as described according to the hierarchical protocol) survives damage or aging better than another signature. For example, a signature may degrade faster than another, or a signature may survive longer with slighter environmental/physical damage. This can also be dictated by the capabilities of the imaging device. Accordingly, the signature may "evolve" over time to where it is really considered different signatures.

According to an example multiple agents protocol, digital signature authentication may use different signatures to authenticate different users (e.g., a doctor versus a nurse) and provide access based on the authenticated signature. Agents may also be a physical device and is not limited to "users," In an example, these signatures are considered to provide differential access rights for various users.

According to an example multiple modalities protocol, digital signature authentication may do a low-level authentication of signatures locally (e.g., on a mobile device), but may also be considered a less secure authentication and for certain operations (when more security is required) may further be required to contact a remote server (e.g., a database or "library") for a higher-level authentication.

Before continuing, it is noted that as used herein, the terms "includes" and "including" mean, but are not limited to, "includes" or "including" and "includes at least" or "including at least." The term "based on" means "based on" and "based at least in part on."

Figure 1:
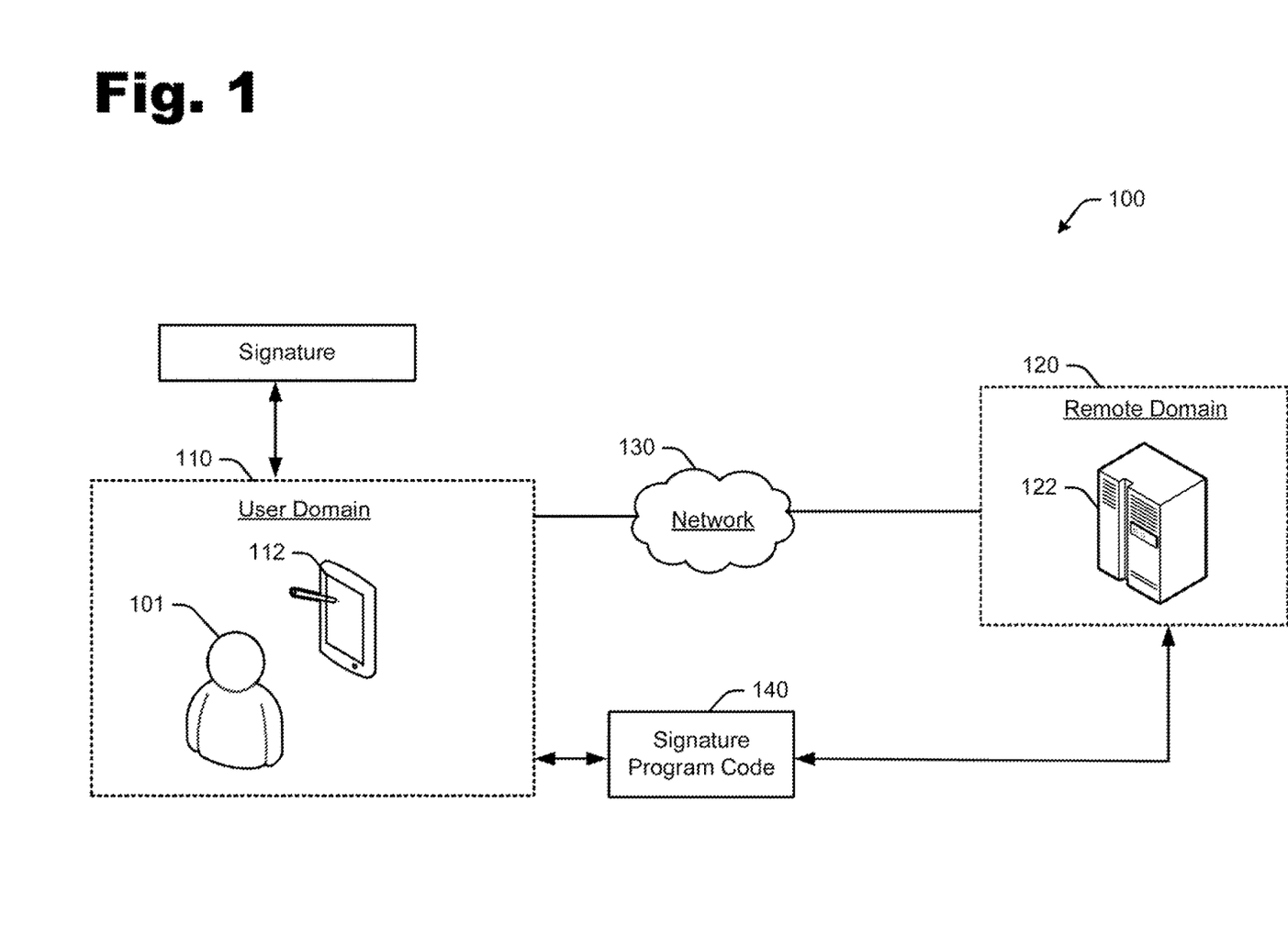
FIG. 1 is a high-level illustration of an example computing system which may be implemented for digital signature authentication.

FIG. 1 is a high-level block diagram of an example computing system which may be implemented for digital signature authentication. Although system 100 is shown as it may be implemented by a user 101 in a networked environment, it is noted that system 100 may also be implemented in a stand-alone environment or a hybrid thereof (e.g., standalone when a network connection is not available or needed, and network environment when desired), as will become apparent from the following discussion.

System 100 may be implemented with any of a wide variety of computing devices, such as, but not limited to, stand-alone scanning appliances, mobile device (e.g., phones, tablets, or other handheld device) computers, servers, and other electronic devices, to name only a few examples. Each of the computing devices may include memory, storage, and a degree of data processing capability at least sufficient to manage a communications connection either directly with one another or indirectly (e.g., via a network). At least one of the computing devices is also configured with sufficient processing capability to execute the program code described herein.

In an example, the system 100 may include a user domain 110 with a user device 112 (e.g., a mobile handheld device), and, a remote domain 120 hosting an authentication server 122. Authentication server 122 may be accessed by the user domain 110 (e.g., via the user device 112) to facilitate digital signature authentication. It is noted that although the server 122 is referred to herein as an "authentication server," a single server or separate servers may be implemented to perform both the recruitment stage and the authentication stage.

In an example, the user device 112 may be provided on a network 130 via a communication connection, such as via an Internet service provider (ISP). In this regard, the user device 112 is able to access the remote domain 120 directly via the network 130, or via an agent, such as another network. Communication network 130 may be any suitable communications channel, such as but not limited to a local area network (LAN) and/or wide area network (WAN). In one example, the network 130 includes the Internet or other mobile communications network (e.g., a 3G or 4G mobile device network).

Network 130 may provide greater accessibility to the remote domain, for use in distributed environments, for example, in a cloud computing environment. Although, it is noted that the operations described herein may be executed by program code 140 residing on the user device 112, in some instances executing the program code 140 (or at least a portion thereof) may be performed on a separate computer system having more processing capability.

For purposes of illustration, the authentication server 122 may provide remote processing, such as but not limited to, executing the program code 140 to process and/or store reference signatures and processing an extracted signature for authentication (at least in part, as processing may also occur at the user device 112). Other processing provided by the authentication server 122 may include, but is not limited to data handling, such as providing information or access to information or other services corresponding to an authenticated signature. The authentication server 122 is not limited in function, and may also provide general purpose computing services.

At least one of the computing devices in the user domain 110 (e.g., user device 112) includes a capture device such as an electronic imaging device (e.g., a camera or low-cost microscope) capable of electronically receiving data for (or "capturing") an image. Image processing program code 140 may also be provided in conjunction with the imaging device to process the captured image data. The program code 140 may be executed by any suitable computing device, and may include interfaces to application programming interfaces (APIs) and related support infrastructure to execute the operations described herein. It is noted that the program code 140 may serve more than one client.

In an example, the imaging device is configured to extract a signature from the image. A processor is provided (locally and/or remote from the imaging device) to execute the program code 140 which compares the extracted signature to a reference signature and authenticates the extracted signature against the reference signature. In an example, the program code may operate according to any of a plurality of different authentication protocols. Example protocols include at least a hierarchical signatures protocol, a revisable selection of signatures protocol, a multiple agents protocol, and a multiple modalities protocol, each of which are described in more detail below.

The system 100 may also include at least one source of content or information. In an example, the source may include but is not limited to databases for providing information, applications for providing application data, and/or storage resources for providing online storage facilities. The source may be physically distributed in the network and operatively associated with the user domain 110 and/or remote domain 120. In an example, the source may be provided at least in part locally to the user device 112 and/or authentication server 122.

The source may include any type and amount of information. For example, information may include data corresponding to a reference signature, wherein the data is available upon authenticating a captured image against the reference signature. Information may also include permissions (e.g., a pass code) that is available to access additional information and/or services (e.g., an application or other aspects of the program code) upon authentication of the captured signature. There is no limit to the type or amount of information that may be provided by the source. In addition, the information may include unprocessed or "raw" data, or the information may undergo at least some level of processing prior to being made available.

It should be noted that the program code 140 may perform recruitment of reference signatures and/or authentication of captured signatures, and is not limited to performing both aspects, or individual aspects thereof. Program code used to implement features of the system can be better understood with reference to FIG. 2 and the following discussion of various example functions. However, the operations described herein are not limited to any specific implementation with any particular type of program code.

Figure 2:
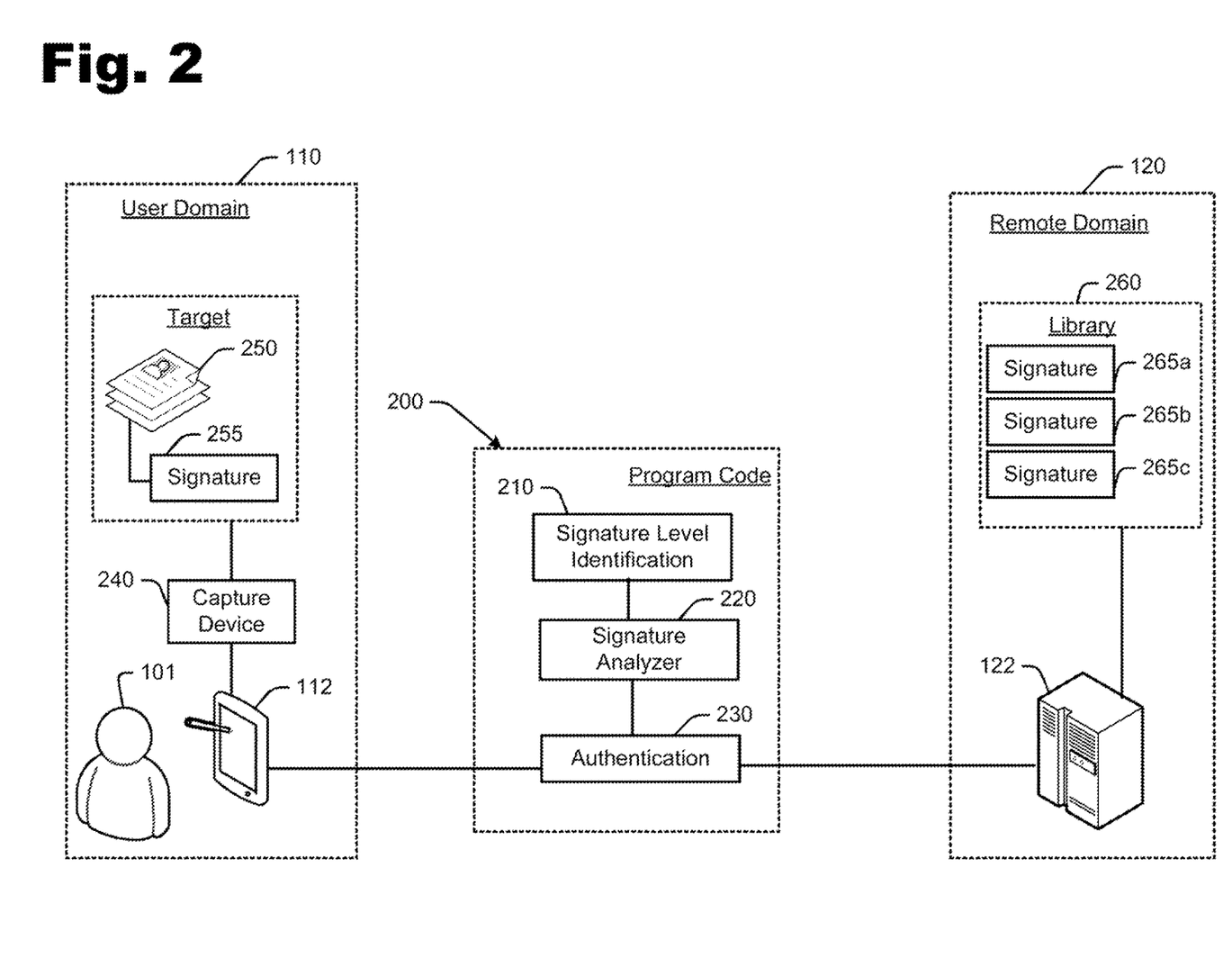
FIG. 2 shows an example architecture of machine readable instructions, which may be executed for digital signature authentication.

FIG. 2 shows an example architecture of machine readable instructions 200, which may be executed for digital signature authentication. In an example, the program code 140 discussed above with reference to FIG. 1 may be implemented in machine-readable instructions 200 (such as but not limited to, software or firmware). The machine-readable instructions 200 may be stored on a non-transient computer readable medium and are executable by one or more processor to perform the operations described herein. It is noted, however, that the components shown in FIG. 2 are provided only for purposes of illustration of an example operating environment, and are not intended to limit implementation to any particular system.

The program code 140 executes the function of the machine readable instructions 200 as self-contained modules. These modules can be integrated within a self-standing tool, or may be implemented as agents that run on top of an existing application. In an example, the architecture of machine readable instructions 200 may include a signature retrieval module 210, a signature analyzer module 220, and an authentication module 230.

In an example, the signature retrieval module 210 is operatively associated with an imaging device 240 for the user device 112. Imaging device 240 may capture a target or a part of the target (e.g., the printed mark 255 of a target 250). It is noted that the imaging device 240 may be used to capture one or both of a reference image and an image for signature authentication.

The signature retrieval module 210 may be implemented to import one or both of a reference signature and a signature for signature authentication; or a separate program code module may be provided to handle the different signature types.

It is noted that the reference signatures(s) 265a-c may be stored in a library 260 in the user domain 110 (e.g., on user device 112), in the remote domain 120, in another domain (e.g., a third party domain, not shown), and/or a combination thereof (e.g., partly on the user device 112, and partly elsewhere).

The signature analyzer module 220 may be executed to analyze the signature (e.g., during a recruitment stage, an authentication stage, or both). The authentication module 230 may be executed to authenticate the signature, e.g., by comparing the captured signature with a reference signature (e.g., one of the reference signatures 265a-c stored in library 265). The authentication module 230 may apply an applicable algorithm to determine whether there is a match (e.g., identical or at least within a predetermined statistical confidence). Examples of analyzing and authenticating an image are discussed below with reference to FIGS. 3 and 4.

Figure 3:
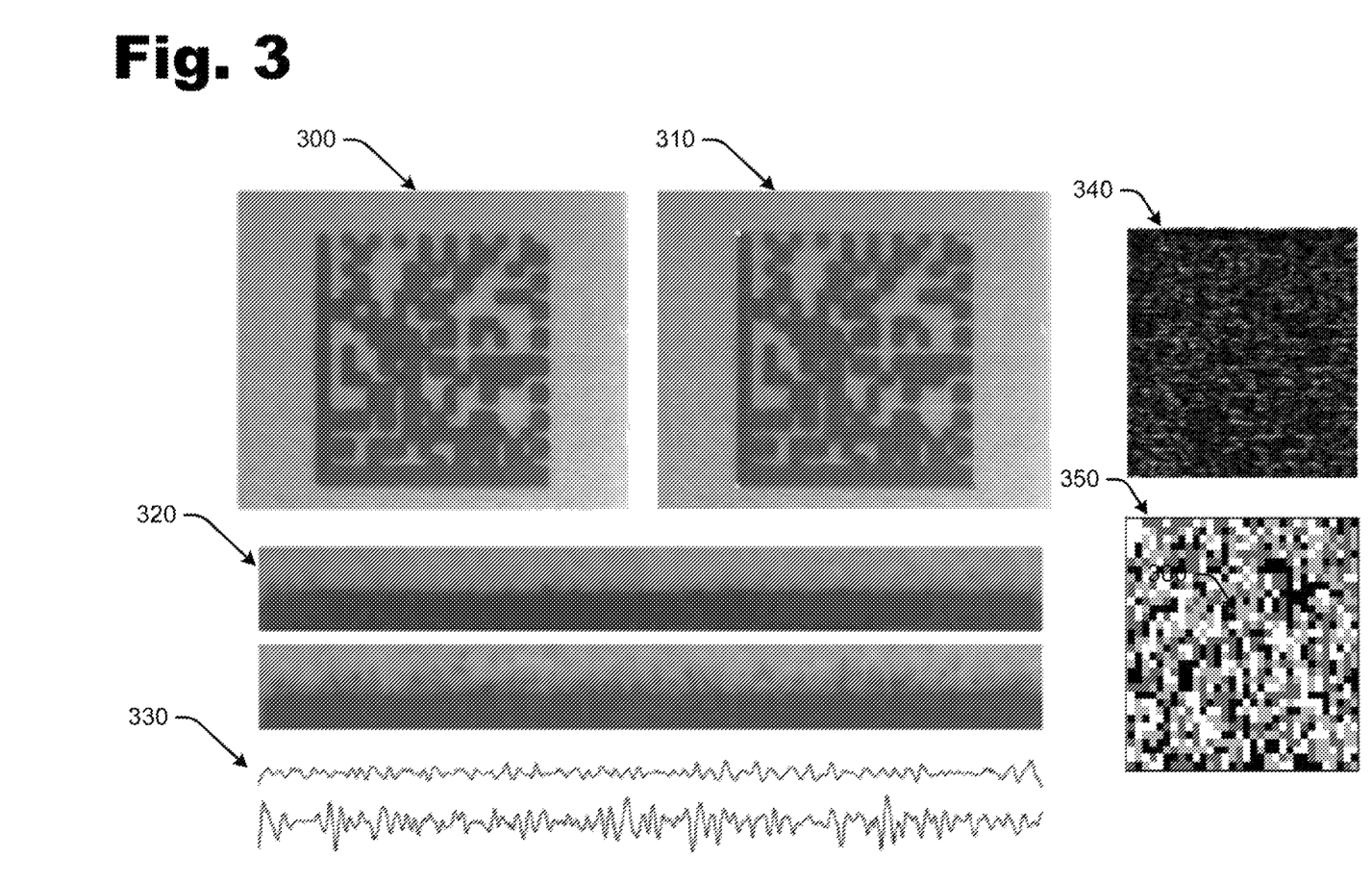
FIG. 3 illustrates an example of image processing which may be implemented for digital signature authentication.

FIG. 3 illustrates an example of image processing which may be implemented for digital signature authentication. It is possible to recover multiple forensic signatures from the same printed item. Consider for example, a printed 4 nm×4 mm Data Matrix (DM) 300. The DM 300 may be captured by a high-resolution, low-cost contact microscope developed, for forensic imaging such as the Dyson Relay Contact Imaging Device (DrCID). A signature can be extracted from the DM 300 by accurately locating the position of the DM in the image using instructions (or a model 310 of the image). In an example, the model 310 includes a grid overlaid on a reference image indicating where in the image the signature resides.

Forensic print signatures 320 may be extracted from the DM 300. For example, the print signatures 320 were extracted from the left and bottom sides of the outline of the DM 300 using a border/outline technique. A pair of long (e.g., 2000 samples) floating signatures (e.g., one for the left edge and one for the bottom edge of the DM), illustrated by signals 330, can be reduced to a total of about 200 bits e.g., using variance coding or random projection.

In another example, an area code signature can be recovered from the central region of the same DM 300 using phase coding. After dewarping the DM using model fit parameters, the dewarped image may be filtered with quadrature pairs of Gabor filters (90 degrees out of phase) to recover real and imaginary components of the local frequency content; the corresponding amplitude image which recombined both parts is shown in 340. The resulting phase code 350 is a coarse sampling (e.g., 32×32) of the quantized phase (2 bits per sample) of the Gabor filtered image.

Outline signatures tend to be easier to process (needing less processing power), and are generally shorter in length (taking less storage space), relative to area-codes. However, area-codes tend to be more robust to damage and may also offer a greater level of security relative to outline signatures. However, as illustrated in FIG. 3, both of these techniques (and/or other techniques) may be applied to extract different signatures from the same image 300. Authentication is the same according to either technique. That is, the image is scanned close to the printing of the forensic mark (e.g., the DM 300) and a signature extracted. The signature can be stored during a recruitment stage, and then used as a reference signature at some point later in time during an authentication stage to prove authenticity of the printed image (or item or person associated with that image).

As discussed above, any of a plurality of protocols may be implemented for digital signature authentication, as explained in more detail below with reference to the illustration in FIG. 4.

Figure 4:
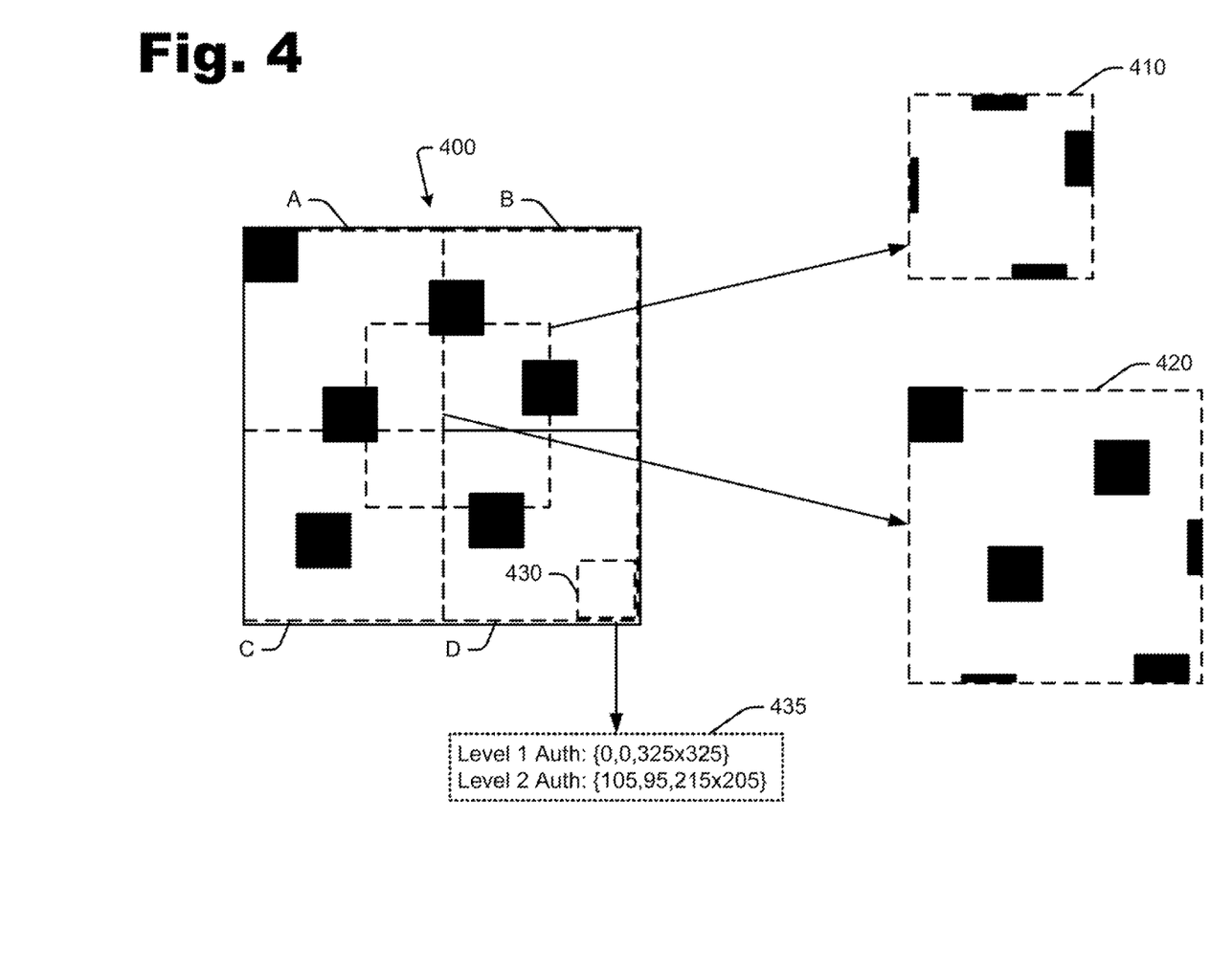
FIG. 4 is an illustration of an example of digital signature authentication.

FIG. 4 is an illustration of an example of digital signature authentication. In this example, the captured or "target" image 400 is an engineered printed mark (i.e., specifically developed for the purpose of extracting a signature for use with digital signature authentication). The signature(s) may be extracted from within the target image 400 in any suitable manner (e.g., associated with a character, glyph, barcode, etc). The signature(s) can be extracted from a linear outline, a 2D area, a halftone (or stegatone) image, or a 3D image or combination thereof. The extracted signature may be compared to a reference signature (previously stored), e.g., to prove authenticity of the item (or label for the item) associated with the high resolution image.

Example protocols include at least a hierarchical signatures protocol, a revisable selection of signatures protocol, a multiple agents protocol, and a multiple modalities protocol. It is noted, however, that other protocols will also be readily apparent to those having ordinary skill in the art after becoming familiar with the teachings herein.

It is noted that each of the protocols below operate on the premise of an image 400 having multiple signatures 410, 420 (more than two may be specified). Thus, in order to identify which signature is to be extracted during authentication, instructions have to be provided. Instructions may be coordinates for each level of authentication (e.g., as shown in box 435 in FIG. 4). Alternatively they may refer to different signature extraction techniques applied to the same image region as shown in FIG. 3. However, other instructions may also be implemented.

In an example, instructions 435 may be included as part 430 of the forensic mark itself. Using a DM makes this an easy task, as part of the payload of the DM can be used to directly specify which type signature was to be extracted from it. However, instructions are not limited to being encoded in a DM. In another example, as the contents of the DM can be used to specify an index into the database the type of signature to be used can be stored indirectly in the database. For example, a unique 96 bit SGTIN may be encoded in a 2D barcode (DM) and read to index a database (either on the user device, or remote server). In yet another example, part of the SGTIN may be used to directly indicate the type of signature to extract. Still other examples of providing instructions 435 will be readily understood by those having ordinary skill in the art after becoming familiar with the teachings herein.

According to an example hierarchical signatures protocol, digital signature authentication includes extracting and comparing a hierarchy of signatures. For example, a first order signature 410 in the hierarchy may be used for authentication. If the first order signature does not provide sufficient confidence in the authenticity, then a second order signature 420 is compared, and so forth. Any number of signatures may be provided according to the hierarchy.

Typically, lower order signatures are more readily extracted/compared (e.g., using less processing power) than higher order signatures, thereby enabling faster authentication when possible. But higher order signatures may provide more confidence in the authentication, and may be used when needed, either in addition to authenticating a lower order signature or instead of authenticating a lower order signature.

In an example, the signatures are evaluated in strict order (e.g., using the least processing power first, and working up to increasingly more "expensive" and robust signatures. For example, when using the outline and area signatures described above with reference to FIG. 3, the area signature is only computed and communicated to a database on a server when the outline signature fails to provide sufficient degree of statistical confidence of authentication. As many items (or people) will be authentic, it can be advantageous to have a quick test of authenticity that most of the time proves to be sufficient. But in the event that an item (or person) cannot be authenticated (typically only a small fraction of the time), a more computationally intensive authentication that is more robust to potential damage or fraud can be used.

The image may include multiple signatures and the authentication process determines which one of these to use. For example, if a first signature is unreadable (if an area of the image containing all or part of the signature has worn off, become damaged, or otherwise unreadable), then another area may be analyzed to obtain the second signature, and so forth, until a readable signature is found that can be authenticated.

These signatures may be discrete areas of the image, or may include portions of multiple areas. For example, an image having areas A, B, C, and (each covering a quarter of the area) may include signatures A, B, C, and D. But additional signatures may be E incorporating aspects of signature A, along with aspects of signature B, and so forth.

The revisable selection of signatures protocol provides a heterogeneous system, with the possibility of multiple signature types that have the potential to evolve over time. This technique may also be used to expire signatures over time for security purposes. For example, signature A may be valid to a date, and then signature B may become valid to another date, and so forth.

In another example, new signatures can be introduced with updates to the program code 140. Thus, the type of signature previously recruited needs to be identified in order to be authenticated properly. That is, an older printed mark associated with an expired signature in the reference database is still authenticated, and then the new signatures can be authenticated. It is noted that the signature can be updated if authentication is successful by replacing the expired signature with current one.

According to an example multiple agents protocol, digital signature authentication may use different signatures to authenticate different users (e.g., a doctor versus a nurse) and provide access based on the authenticated signature. Agents may also be a physical device and is not limited to "users." In addition, users do not need to have lower/higher authority, but can simply be agents with different purposes.

The multiplicity of signature types may be used by different agents in the lifecycle or "workflow" of an item to which the signatures are attached, By way of illustration, low-security agents may use one of the signatures (e.g., signature 410), but are not allowed to validate the other signature(s) (e.g., signature 420). This prevents low security or other "low trust" agents to check one or more of the signatures.

According to an example multiple modalities protocol, digital signature authentication may handle authentication via different processing paradigms. For example, a local processing paradigm (e.g., all on the users device) may be used for low-level authentication of signature 410. This is useful for quick authentication as the user device uses less processing power and does not need to be connected to a computer network. While appropriate in some cases, this low-level authentication may also be considered a less secure authentication as the reference signatures must be made available to the user's device. Some operations (e.g., when more security is required) may further be required, to contact a remote server (e.g., a database or "library") to obtain a higher-level authentication (e.g., of signature 420). In an example, the higher-level signature 420 may be more complex (thus requiring the additional processing power of a server computer). In another example, the higher-level reference signature may simply not be provided on the local device.

In an example, the signature type is used on-device (e.g., no image or extraction signature is transmitted to a backend server). In addition, another signature type can only be authenticated when the signature is sent to the backend service. The latter motif means that the image and/or extraction signature is sent to the backend service, but the actual reference signature is never shared with the user's device (e.g., only a binary pass/fail is provided). In an example, on-device authentication may be performed by caching active signatures on the device itself. In another example, the signature may be encoded an the image itself. In another example, the signature may be provided via another document, or a separate electronic medium (e.g., an RFID tag, associated with the item).

In another example of multiple database workflow, one set of signatures (e.g., same "type" amongst two or more signatures across many objects) is stored in one database, and the other set of signatures is stored in an independent database. The system can then apply completely different rules to these two databases. For example, one signature can be generally accessible and is used to find the closest sequence to the signature that is recovered, which can then be used as a lookup (entry field) to the second database if/when access rights are granted. The first database can also be associated with a visible printed mark (e.g., the first signature is read during printing/packaging and the signature added as a final printed, value/representation) and the second is not visible (e.g., only accessed through an online connection, secure connection, on-location connection, etc.). This allows a combination of off-line (e.g., one database stored on the reading device) and on-line connection (e.g., remote, more secure database).

Before continuing, it should be noted that the examples described above are provided for purposes of illustration, and are not intended to be limiting. Other devices and/or device configurations may be utilized to carry out the operations described herein.

Figure 5:
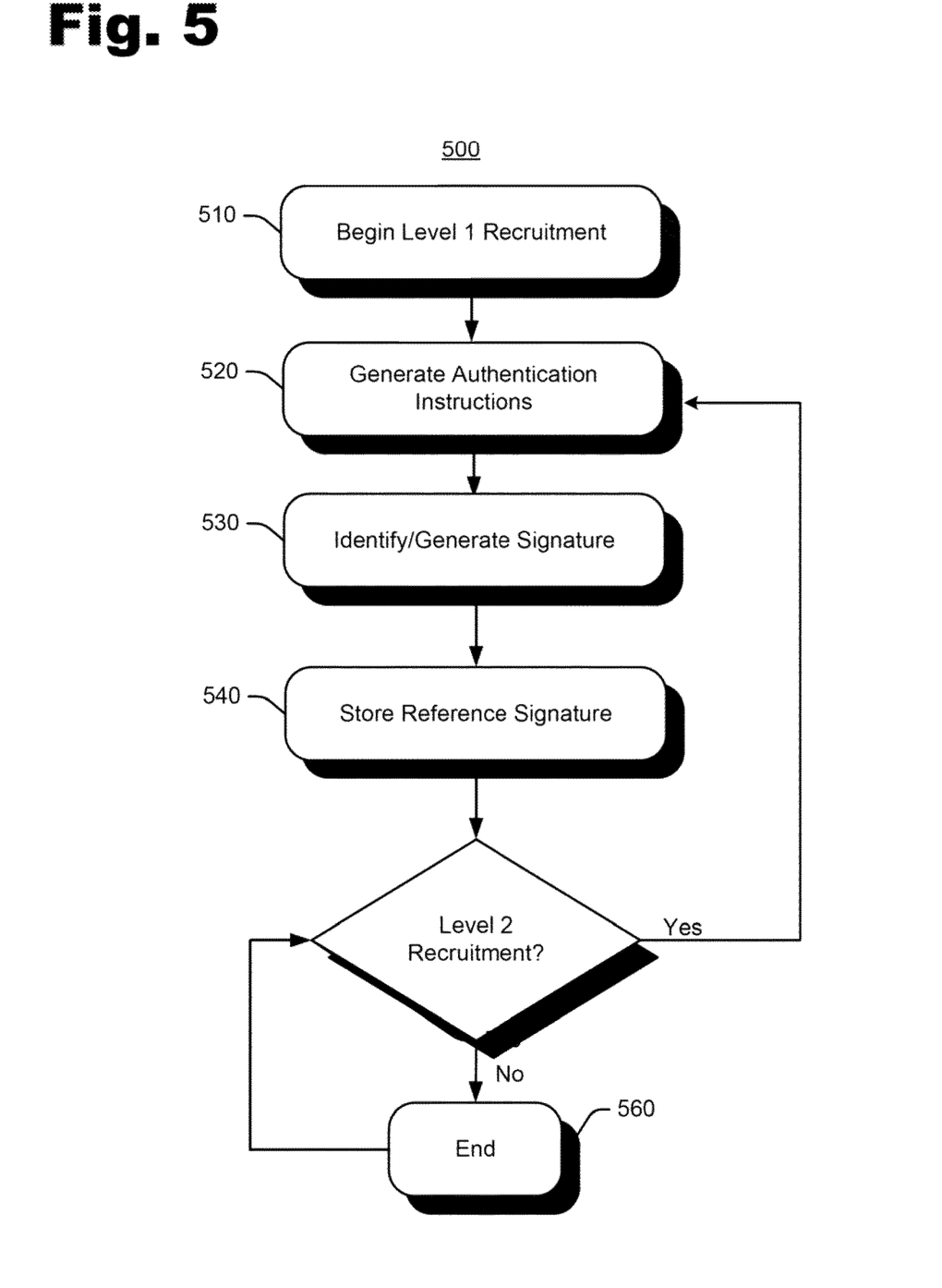
FIGS. 5-6 are flowcharts illustrating example operations which may implement digital signature authentication.
Figure 6:
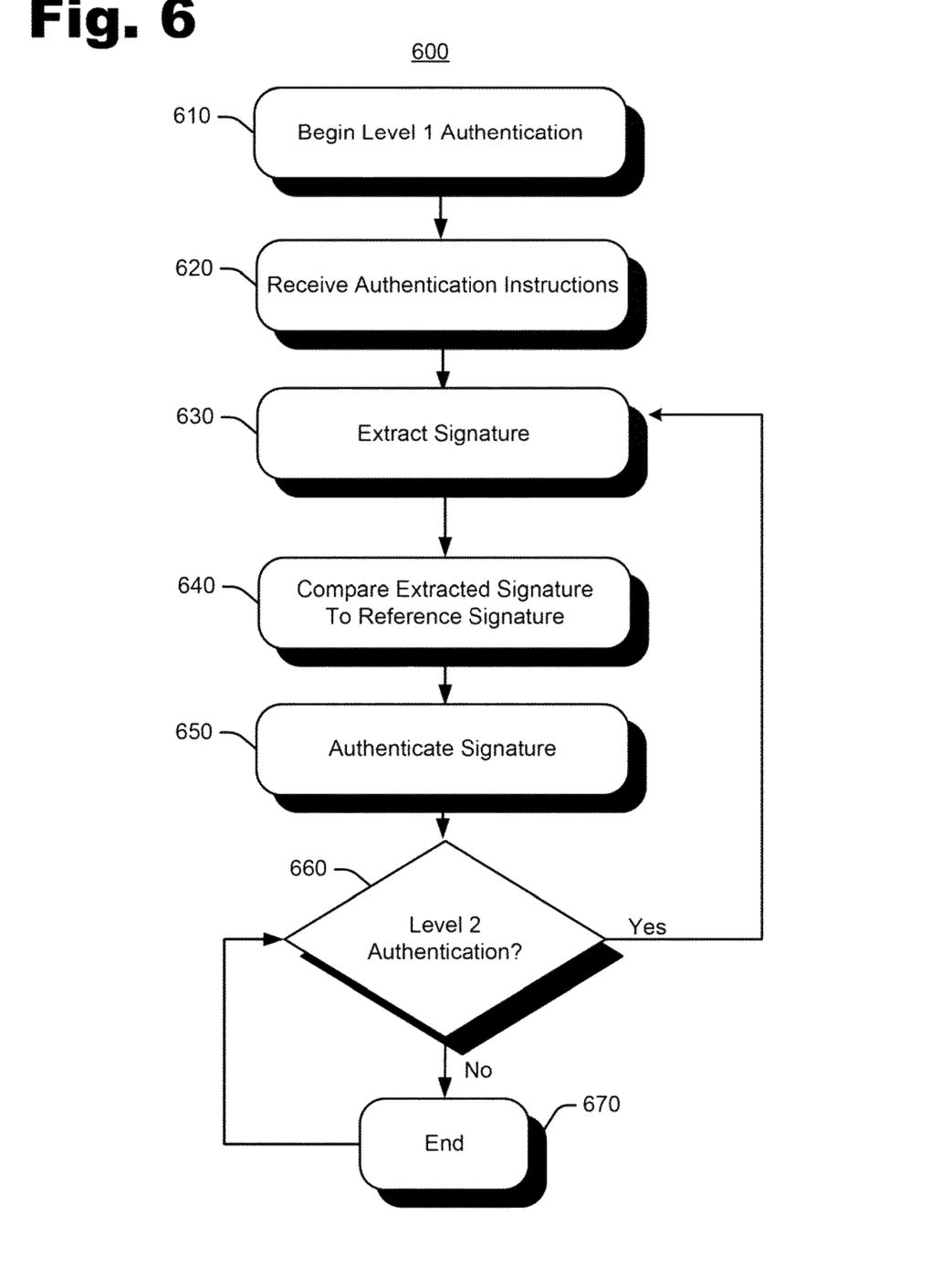

FIGS. 5-6 are flowcharts illustrating example operations which may implement digital signature authentication. Operations may be embodied as logic instructions on one or more computer-readable medium. When executed on a processor, the logic instructions cause a general purpose computing device to be programmed as a special-purpose machine that implements the described operations. In an example, the components and connections depicted in the figures may be used.

FIG. 5 illustrates digital signature authentication operations 500 which may be implemented in a recruitment stage. During the recruitment stage, signatures are added to a database for future reference.

Operation 510 includes beginning Level 1 recruitment. It is noted that Level 1 and Level 2 refer to distinct signatures, and that other levels may also be used. In a hierarchical signatures protocol example, Level 1 may be a hierarchically different signature relative to Level 2. In a revisable selection of signatures protocol example, Level 1 may be an initial signature relative to a revised or "Level 2" signature. In a multiple agents protocol example, Level 1 may be a signature for a different agent than Level 2. In a multiple modalities protocol example, Level 1 may be a lower security signature than Level 2.

In an example, recruitment may proceed for any of a plurality of different protocols. Example protocols include but are not limited to a hierarchical signatures protocol, a revisable selection of signatures protocol, a multiple agents protocol, a multiple modalities protocol, and/or variations thereof.

Operation 520 includes generating authentication or recruitment instructions. These instructions may be coordinates or other information for identifying a location of a signature within an image. In an example, the authentication instructions may be embedded in the image.

Operation 530 includes choosing regions of an image that form a signature. In addition, operation 530 includes choosing the type of signature to extract from each region.

Operation 540 includes storing a reference signature. In an example, the reference signature may be stored in a remote database (e.g., stored separate from the device generating and/or reading the signature. In an example, the reference signature may be stored locally (or transmitted to a mobile device for use on the mobile device without having to contact a remote database). It is noted that typically less secure signatures and/or signatures needing less processing power to authenticate may be stored on the device itself, and more secure signatures and/or signatures needing more processing power to authenticate may be stored in a remote database (e.g., handled by a server with more security and/or computing power).

Operation 550 includes determining whether to enter Level 2 Recruitment. If another level signature is to be recruited, then operations may return to operation 520. Otherwise, if recruitment is complete, then operations may end at 560.

It is noted that more than Level 1 and Level 2 recruitment may be implemented by following similar operations. That is, recruitment is not limited to Level 1 and Level 2, and may include any number of signature levels. In addition, the recruitment phase may be re-entered at any time. For example, new signature levels may be recruited in the revisable selection of signatures protocol which are removed in time from the initial recruitment (e.g., a better—more robust—type of signature is discovered for use from this point in time; and the old signature will no longer be used).

FIG. 6 illustrates digital signature authentication operations 600 which may be implemented in an authentication stage. During the authentication stage, signatures are extracted from a target image, and compared with the previously stored signatures (e.g., those stored during the recruitment stage), Digital signature authentication may operate according to any of a variety of protocols.

Operation 610 includes beginning Level 1 authentication. Authentication starts by some way of selecting which signature the system is authentication against e.g., hierarchical, revisable, agent or modality based selection. As during the recruitment stage, it is noted that Level 1 and Level 2 refer to distinct signatures, and that other levels may also be used. In an example, authentication may proceed according to any of a plurality of different protocols. Example protocols include but are not limited to a hierarchical signatures protocol, a revisable selection of signatures protocol, a multiple agents protocol, a multiple modalities protocol, and/or variations thereof.

Operation 620 includes receiving authentication instructions. Authentication instructions may be coordinates or other information for identifying a location of a signature within an image. In an example, the authentication instructions may be embedded in the image and are retrieved or extracted from the image, e.g., using an image processor. That is, the instructions may referenced by a code within the image, and upon looking up the reference for the code, information in the form of coordinates or other information are provided (e.g., from a local and/or remote database) for identifying a location of a signature within the image. Other techniques may also be deployed for providing instructions. The instructions do not need to be provided in the image. For example, instructions may be provided based on a GPS coordinate of the mobile device.

Operation 630 includes extracting a signature from the image. In an example the signature is extracted from the image based on the instructions received in operation 620. The signature may be extracted using an image processing device (e.g., a microscope or other optical device and associated interpretative program code).

Operation 640 includes comparing the extracted signature (e.g., from operation 630) to a reference signature (e.g., the reference signature stored in the recruitment stage of FIG. 5). In an example, the reference signature may be stored and/or retrieved from a remote database (e.g., stored separate from the device generating and/or reading the signature). In an example, the reference signature may be retrieved locally. As noted above, less secure signatures and/or signatures needing less processing power to authenticate may be stored on the device itself, and more secure signatures and/or signatures needing more processing power to authenticate may be stored, in a remote database (e.g., handled by a server with more security and/or computing power).

Operation 650 includes authenticating the signature. Authentication may be based on any number of considerations, including but not limited to an exact match or a match satisfying at least some level of statistical confidence.

Operation 660 includes determining whether to enter Level 2 authentication. If another level signature is to be authenticated, then operations may return to operation 520. If authentication is complete at operation 660, then operations may end at 670.

By way of illustration, operations may repeat according to the hierarchical signatures protocol. For example, a first order (e.g., Level 1) signature is compared during an authentication stage, and if the first order signature does not provide sufficient confidence in authenticity, then a higher order (e.g., Level 2) signature is compared.

In another example of the hierarchical signatures protocol, the first order (e.g., Level 1) signature may provide faster authentication than the higher order (e.g., Level 2) signature. Hence the first order signature may be authenticated on the mobile device. But when greater confidence is needed in authenticating the signature, the higher order signature is authenticated remotely because it provides greater confidence in authentication than the first order signature.

By way of illustration, operations may repeat according to a revisable selection of signatures protocol, wherein the signatures evolve over time. Hence, the first (e.g., Level 1) signature may be used for authentication until such time that a second (e.g., Level 2) signature is used for authentication. It is noted that in this example, the image may give rise to a plurality of signatures and the extracted signature may be selected from the plurality of signatures, as described above with reference to FIG. 3. It is also noted that signatures may be expired over time and new signatures created.

By way of illustration, operations may repeat according to multiple agents protocol, wherein different signatures authenticate different agents. For example, a hospital administrator may need an administrative (e.g., Level 1) signature authentication, and a doctor may need a medical (e.g., Level 2) signature authentication, thereby providing the respective users with the appropriate level of information about a patient.

By way of illustration, operations may repeat according to the multiple modalities authentication protocol. For example, a low-level (e.g., Level 1) authentication of signatures may be performed locally (e.g., on a mobile device), which uses less processing power (e.g., authentication at a binary or pass/fail granularity). But the Level 1 authentication may also be considered a less secure authentication. For certain operations (e.g., when more security is required), a higher-level (e.g., Level 2) authentication may be provided by a remote server (e.g., a database or "library").

The operations shown and described herein are provided to illustrate example implementations. It is noted that the operations are not limited to the ordering shown. Still other operations may also be implemented.

Still further operations may include for example, but are not limited to determining which one of the plurality of protocols and/or signatures to use during authenticating.

The operations may be implemented at least in part using an end-user interface (e.g., web-based interface). In an example, the end-user is able to make predetermined selections, and the operations described above are implemented on a back-end device to present results to a user. The user can then make further selections. It is also noted that various of the operations described herein may be automated or partially automated.

It is noted that the examples shown and described are provided for purposes of illustration and are not intended to be limiting. Still other examples are also contemplated.

The invention claimed is:

1. A method of digital signature authentication, comprising:
   extracting multiple extracted signatures from a single image of a printed forensic mark using different lines with respect to, or areas of, the forensic mark;
   comparing an extracted signature from the image to a reference signature, wherein each signature is a data set based on innate stochastic properties of printed forensic mark and interaction of the printed forensic mark with a substrate on which that printed forensic mark is printed;
   and authenticating the extracted signature against the reference signature according to one of a plurality of different authentication protocols including at least a hierarchical signatures protocol, a revisable selection of signatures protocol, a multiple agents protocol, and a multiple modalities protocol.

2. The method of claim 1, further comprising:
   a recruitment stage, wherein the reference signature is added to a database for future reference;
   and an authentication stage, wherein the extracted signature is compared with the reference signature stored during the recruitment stage.

3. The method of claim 1, wherein during the hierarchical signatures protocol, a first order signature is compared during an authentication stage, and if the first order signature does not provide sufficient confidence in authenticity, then a higher order signature is compared.

4. The method of claim 3, wherein the first order signature provides faster authentication than the higher order signature, and wherein the higher order signature provides greater confidence in authentication than the first order signature.

5. The method of claim 1, wherein during the revisable selection of signatures protocol, a plurality of signatures evolve over time.

6. The method of claim 5, further comprising selecting the extracted signature from the plurality of signatures based on time at which the reference signature is recruited.

7. The method of claim 6, further comprising determining which one of the plurality of signatures to use during authenticating.

8. The method of claim 7, further comprising replacing an expired reference signature with a revised signature.

9. The method of claim 1, wherein during the multiple agents protocol, different signatures authenticate different agents.

10. The method of claim 1, further comprising a multiple database workflow, wherein a first signature authentication database is local to a reader device and a second signature authentication database is remote from the reader device.

11. The method of claim 1, further comprising providing at least one of a local authentication and a remote authentication of the extracted signature during the multiple modalities protocol.

12. The method of claim 11, wherein the remote authentication provides binary authentication of the extracted signature.

13. The method of claim 11, wherein each extracted signal is an analog signal based on the corresponding line or area of the forensic mark.

14. A system for digital signature authentication, comprising computer-readable instructions stored on a non-transient computer-readable medium, the computer-readable instructions executed by a processor to:
- extract a signature from an image of a forensic mark, wherein the signature is a data set based on innate stochastic properties of a printed image of the forensic mark and interaction of the printed image with a substrate on which that printed image is printed, the signature being based on a line crossing the forensic mark;
- access a reference signature stored in a database of reference signatures;
- compare the extracted signature to the reference signature; and
- authenticate the extracted signature against the reference signature.

15. A digital signature authentication system, comprising:
an imaging device configured to extract a signature from a printed image, wherein the signature is a data set based on innate stochastic properties of the printed image and interaction of the printed image with a substrate on which that printed image is printed;
and a processor to control the imaging device to extract the signature of the printed image differently depending on a threshold of confidence desired in authenticating the extracted signature and to compare the extracted signature to a reference signature and authenticate the extracted signature against the reference signature.

16. The digital signature authentication system of claim 15, wherein the signature is based on a specific aspect of the printed image and multiple signatures are extracted using different extraction modes or from different portions of the printed image.

17. The digital signature authentication system of claim 15, wherein multiple signatures are extracted and compared against corresponding reference signatures according to a hierarchical signatures protocol until a desired confidence level of signature authentication is achieved.

18. The digital signature authentication system of claim 17, wherein the printed image comprises instructions as to which of the multiple signatures to use for authentication.

19. The digital signature authentication system of claim 15, wherein the imaging device and processor are in different domains connected by a computer network to increase security of signature authentication.

20. The digital signature authentication system of claim 15, wherein the imaging device uses phase coding to extract the signature from the image.

* * * * *